United States Patent
Chamarthi

(10) Patent No.: US 11,298,638 B2
(45) Date of Patent: Apr. 12, 2022

(54) AUTOMATIC CLEAN AIR FILTER FOR AIR CONDITIONER UNIT

(71) Applicant: Haier US Appliance Solutions, Inc., Wilmington, DE (US)

(72) Inventor: Sai Krishna Chamarthi, Khammam (IN)

(73) Assignee: Haier US Appliance Solutions, Inc., Wilmington, DE (US)

( * ) Notice: Subject to any disclaimer, the term of this patent is extended or adjusted under 35 U.S.C. 154(b) by 144 days.

(21) Appl. No.: 16/736,943

(22) Filed: Jan. 8, 2020

(65) Prior Publication Data

US 2021/0205742 A1    Jul. 8, 2021

(51) Int. Cl.
| | | |
|---|---|---|
| *B01D 33/46* | (2006.01) |
| *B01D 35/10* | (2006.01) |
| *F24F 13/28* | (2006.01) |
| *B01D 46/00* | (2022.01) |
| *B01D 46/22* | (2006.01) |
| *B01D 46/20* | (2006.01) |

(52) U.S. Cl.
CPC .............. *B01D 33/46* (2013.01); *B01D 35/10* (2013.01); *B01D 46/0052* (2013.01); *B01D 46/0057* (2013.01); *B01D 46/20* (2013.01); *B01D 46/22* (2013.01); *F24F 13/28* (2013.01)

(58) Field of Classification Search
CPC ......... F24F 13/28; B01D 46/28; B01D 46/18; B01D 46/20; B01D 46/22; B01D 46/0052; B01D 46/0057; B01D 33/46; B01D 33/44; B01D 35/10
See application file for complete search history.

(56) References Cited

U.S. PATENT DOCUMENTS 4,521,230 A    6/1985  Strong

FOREIGN PATENT DOCUMENTS

| CN | 202521740 U | 11/2012 | |
|---|---|---|---|
| CN | 204912195 U | 12/2015 | |
| JP | 2010032133 A * | 2/2010 | .............. F24F 13/28 |

* cited by examiner

*Primary Examiner* — Robert A Hopkins
(74) *Attorney, Agent, or Firm* — Dority & Manning, P.A.

(57) ABSTRACT

An air conditioner unit includes a blower fan, an inlet grille upstream of the blower fan, and an outlet grille downstream of the blower fan. The air conditioner unit also includes an air filter positioned between the inlet grille and the outlet grille with a belt encircling and enclosing the air filter on four sides. The air conditioner unit further includes a motor operatively connected to the belt. The motor is configured to rotate the belt around the air filter and thereby clean the air filter.

16 Claims, 6 Drawing Sheets

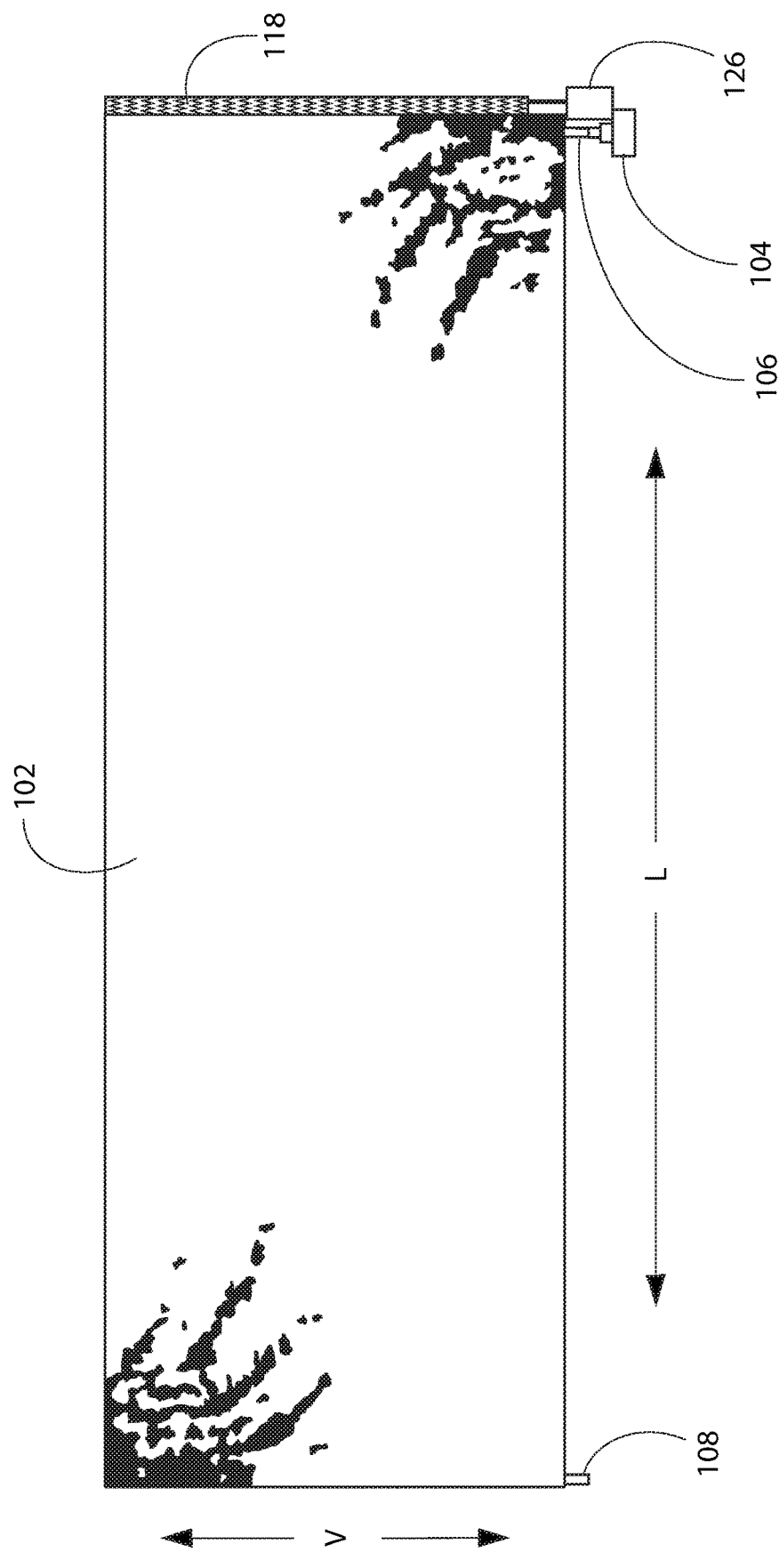

AUTOMATIC CLEAN AIR FILTER FOR AIR CONDITIONER UNIT

FIELD OF THE INVENTION

The present disclosure relates generally to air conditioner units, and more particularly to methods and apparatus for filtering air flow within air conditioner units.

BACKGROUND OF THE INVENTION

Air conditioner units are conventionally utilized to adjust the temperature within structures such as dwellings and office buildings. In particular, one-unit type room air conditioner units may be utilized to adjust the temperature in, for example, a single room or group of rooms of a structure. A typical such air conditioner unit includes an indoor portion and an outdoor portion. The indoor portion is generally located indoors, and the outdoor portion is generally located outdoors. Accordingly, the air conditioner unit generally extends through a wall, window, etc. of the structure.

In the outdoor portion of a conventional air conditioner unit, a compressor that operates a refrigerating cycle is provided. At the back of the outdoor portion, an outdoor heat exchanger connected to the compressor is disposed, and facing the outdoor heat exchanger, an outdoor fan for cooling the outdoor heat exchanger is provided. At the front of the indoor portion of a conventional air conditioner unit, an air inlet is provided, and above the air inlet, an air outlet is provided. A blower fan and a heating unit are additionally provided in the indoor portion. Between the blower fan and heating unit and the air inlet, an indoor heat exchanger connected to the compressor is provided.

When cooling operation starts, the compressor is driven to operate the refrigerating cycle, with the indoor heat exchanger serving as a cold-side evaporator of the refrigerating cycle, and the outdoor heat exchanger as a hot-side condenser. The outdoor heat exchanger is cooled by the outdoor fan to dissipate heat. As the blower fan is driven, the air inside the room flows through the air inlet into the air passage, and the air has its temperature lowered by heat exchange with the indoor heat exchanger, and is then blown into the room through the air outlet. In this way, the room is cooled.

When heating operation starts, the heating unit is operated to raise the temperature of air in the air passage. The air, having had its temperature raised, is blown out through the air outlet into the room to heat the room.

In many currently known air conditioner units, the air drawn into the air conditioner unit may pass through an air filter. Such air filters may protect internal components of the air conditioner unit and/or improve indoor air quality. However, such air filters also tend to become clogged and require manual replacement or cleaning, which often involves at least partial disassembly of the air conditioner unit, e.g., dismounting of a face portion of the air conditioner unit to access the filter.

Accordingly, improved methods and apparatus for air conditioner units are desired. In particular, methods and apparatus that provide longer-lasting and lower maintenance air filters would be advantageous.

BRIEF DESCRIPTION OF THE INVENTION

Aspects and advantages of the invention will be set forth in part in the following description, or may be obvious from the description, or may be learned through practice of the invention.

In accordance with one embodiment, an air conditioner unit is provided. The air conditioner unit defines a vertical direction, a lateral direction, and a transverse direction. The vertical direction, the lateral direction, and the transverse direction are mutually perpendicular. The air conditioner unit includes an inlet grille and an outlet grille providing fluid communication between an indoor portion of the air conditioner and an ambient environment. The air conditioner unit also includes a blower fan positioned in the indoor portion of the air conditioner unit. The blower fan is operable to urge air into the indoor portion of the air conditioner unit through the inlet grille and to urge air out of the indoor portion of the air conditioner unit through the outlet grille. An air filter is positioned between the inlet grille and the outlet grille such that air urged by the blower fan passes through and is filtered by the air filter before the air is urged out of the indoor portion of the air conditioner unit through the outlet grille. The air conditioner unit also includes a belt encircling and enclosing the air filter on four sides and a motor operatively connected to the belt. The motor is configured to rotate the belt around the air filter and thereby clean the air filter.

In accordance with another embodiment, an air conditioner unit is provided. The air conditioner unit includes a blower fan. The air conditioner unit also includes an inlet grille upstream of the blower fan and an outlet grille downstream of the blower fan. The air conditioner unit further includes an air filter positioned between the inlet grille and the outlet grille with a belt encircling and enclosing the air filter on four sides. A motor is operatively connected to the belt. The motor is configured to rotate the belt around the air filter and thereby clean the air filter.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 6 is a front view of the automatic air filter cleaning assembly of FIG. 3.

DETAILED DESCRIPTION OF THE INVENTION

Figure 1:
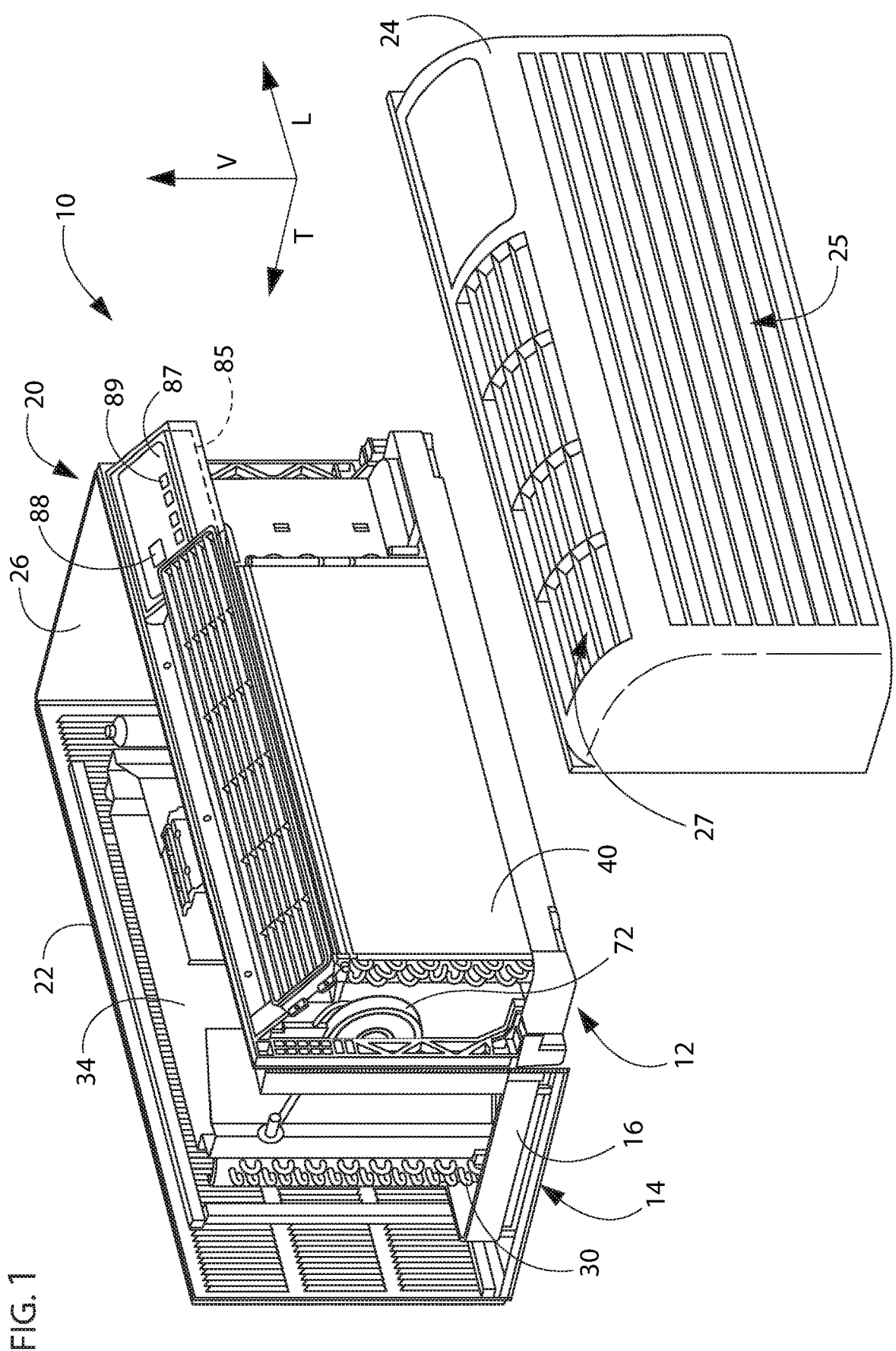
FIG. 1 provides a perspective view of an air conditioner unit, with a room front exploded from a remainder of the air conditioner unit for illustrative purposes, in accordance with one or more embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. As used herein, terms of approximation such as "generally," "about," or "approximately" include values within ten percent greater or less than the stated value. When used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

Figure 2:
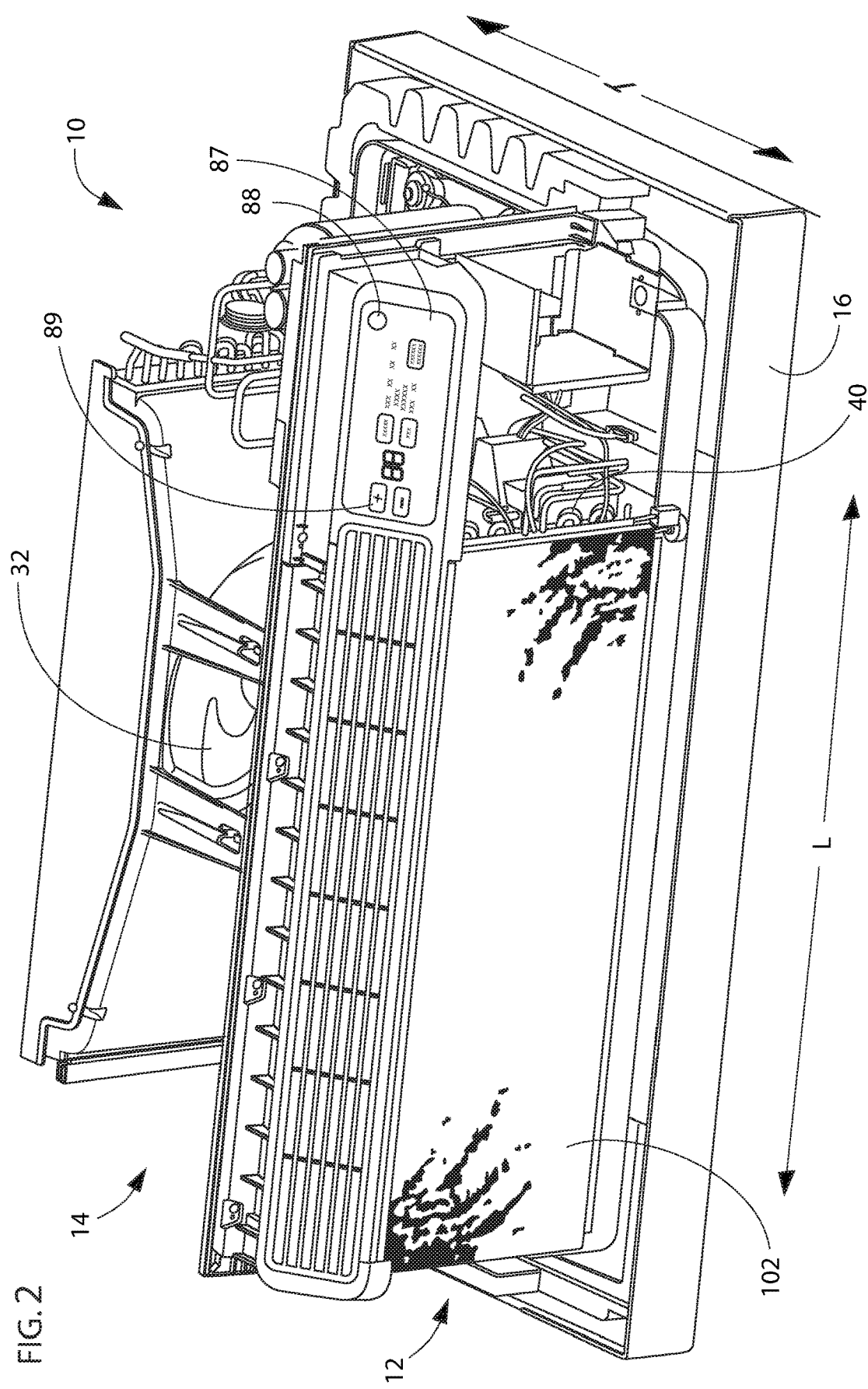
FIG. 2 is a perspective view of some components of an air conditioner unit in accordance with one or more embodiments of the present disclosure.

Referring now to FIGS. 1 and 2, an air conditioner unit 10 is provided. The air conditioner unit 10 is a one-unit type air conditioner, also conventionally referred to as a room air conditioner. The unit 10 includes an indoor portion 12 and an outdoor portion 14, and generally defines a vertical direction V, a lateral direction L, and a transverse direction T. The directions V, L, and T are mutually perpendicular to each other, such that an orthogonal coordinate system is generally defined.

A housing 20 of the unit 10 may contain various other components of the unit 10. Housing 20 may include, for example, a rear grill 22 and a room front 24 which may be spaced apart along the transverse direction T by a wall sleeve 26. The rear grill 22 may be part of the outdoor portion 14, while the room front 24 is part of the indoor portion 12. A basepan 16 may be positioned within the housing 20. Components of the outdoor portion 14, such as an outdoor heat exchanger 30, outdoor fan 32 (FIG. 2), and compressor (not shown) may be housed within the wall sleeve 26. A casing 34 may additionally enclose the outdoor fan, as shown.

The indoor portion 12 may include, for example, an indoor heat exchanger 40, a blower fan 72, and a heating unit (not shown). These components may, for example, be housed behind the room front 24. In at least some embodiments, the unit 10 may also include a reversing valve for reversing a direction of refrigerant flow between the outdoor heat exchanger 30 and the indoor heat exchanger 40 to provide a heat pump operation mode, as is generally understood in the art. Additionally, the room front 24 may include or define an inlet grille 25 and an outlet grille 27.

In exemplary embodiments, blower fan 72 may be a tangential fan. Alternatively, however, any suitable fan type may be utilized. The blower fan 72 may be disposed within the indoor portion 12 of the unit 10. Blower fan 72 may include a blade assembly and a motor. Operation of the motor may rotate the blades, thus generally operating the blower fan 72. The structure and function of motors and blade assemblies for blower fans are generally understood by those of ordinary skill in the art and, as such, are not shown or described in greater detail herein for the sake of clarity and brevity.

The inlet grille 25 and the outlet grille 27 may provide fluid communication between an ambient environment, e.g., a room, and the indoor portion 12 of the air conditioner unit 10. The inlet grille 25 may be upstream of the blower fan 72 and the outlet grille 27 may be downstream of the blower fan 72. Accordingly, during operation of the blower fan 72, the blower fan 72 may urge air into the indoor portion 12 of the air conditioner unit 10 through the inlet grille 25 and may urge air out of the indoor portion 12 of the air conditioner unit 10 through the outlet grille 27.

The operation of air conditioner unit 10, including the blower fan 72, the outdoor heat exchanger 30, the indoor heat exchanger 40, and other suitable components, may be controlled by a processing device such as a controller 85. Controller 85 may be in operable communication with, e.g., operably connected to (via for example a suitable wired or wireless connection) such components of the air conditioner unit 10. By way of example, the controller 85 may include a memory and one or more processing devices such as microprocessors, CPUs or the like, such as general or special purpose microprocessors operable to execute programming instructions or micro-control code associated with operation of unit 10. The memory may represent random access memory such as DRAM, or read only memory such as ROM or FLASH. In one embodiment, the processor executes programming instructions stored in memory. The memory may be a separate component from the processor or may be included onboard within the processor. It should be understood that, in exemplary embodiments, the controller 85 in accordance with the present disclosure may be operable to perform the various methods steps as disclosed herein.

Unit 10 may additionally include a control panel 87 and one or more user inputs 89, which may be included in control panel 87. The user inputs 89 may be in communication with the controller 85. A user of the unit 10 may interact with the user inputs 89 to operate the unit 10, and user commands may be transmitted between the user inputs 89 and controller 85 to facilitate operation of the unit 10 based on such user commands. A display 88 may additionally be provided in the control panel 87, and may be in communication with the controller 85. Display 88 may, for example, be a touchscreen or other text-readable display screen, or alternatively may simply be a light that can be activated and deactivated as required to provide an indication of, for example, one or more events or settings for the unit 10.

Turning specifically to FIG. 2, the air conditioner unit 10 may include an air filter 100 (see, e.g., FIGS. 3-5) and a belt 102 which encircles the filter 100 and encloses the filter 100 on four sides (the air filter 100 is not visible in FIG. 2 because it is enclosed by the belt 102). The air filter 100 and belt 102 are not shown in FIG. 1 in order to more clearly depict internal components of the exemplary air conditioner unit 10. In particular, as may be generally seen throughout FIGS. 2 through 6, the belt 102 may fully enclose the air filter 100 on each of the four sides, e.g., the belt 102 may enclose the air filter 100 along each of the vertical, lateral, and transverse directions V, L, and T at each of the four sides.

The air filter 100 may be positioned between the inlet grille 25 and the outlet grille 27. Thus, air urged by the blower fan 72 may pass through the air filter 100 and may be filtered by the air filter 100 before the air is urged out of the indoor portion 12 of the air conditioner unit 10 through the outlet grille 27. For example, the air filter 100 may be downstream of the inlet grille 25 and upstream of the outlet grille 27. In some embodiments, the air filter 100 may be positioned upstream of components of the air conditioner unit 10 in the indoor portion 12, such as the indoor heat exchanger 40 and the blower fan 72. Thus, the air filter 100 may provide improved indoor air quality, by virtue of being upstream of the outlet grille 27, and may protect components of the air conditioner unit 10 within the indoor portion 12 from contamination, by virtue of being upstream therefrom, as described.

As mentioned, the air filter 100 filters the air which is urged through the air conditioner unit 10 by the blower fan 72. For example, the air filter 100 may remove particles from the air. For example, "particles" as used herein may include dust, pollen, mold, hair, dander, or other airborne matter, as will be understood by those of ordinary skill in the art. Accordingly, such particles may accumulate on outer surfaces 122 and 124, in particular an upstream surface 122, of the air filter 100 over time. If left unchecked, such accumulated particles may eventually obstruct air flow through the filter 100, resulting in reduced efficiency or efficacy of the air filter 100 and/or the air conditioner unit 10. Thus, the belt 102 may be operable to clean the air filter 100, as will be described in more detail below. For example, the belt 102 may be operable to automatically clean the air filter 100, such as when a motor 104 is activated by the controller 85 to motivate the belt 102 around the air filter 100. The motor 104 may be activated in response to a user input command and/or in response to a signal from the controller 85 based on, e.g., a predetermined time interval or a detected decrease in air flow into, through, and/or out of the air conditioner unit 10.

Turning now to FIGS. 3 through 6, the motor 104 may be operatively connected to the belt 102. The motor 104 may be any suitable motor, such as a stepper motor. The motor 104 may be configured to rotate the belt 102 around the air filter 100 and thereby clean the air filter 100. For example, in some embodiments, the air conditioner unit 10 may include a first roller 106 and a second roller 108 positioned opposite the first roller 106 along the lateral direction L. The belt 102 may be wound around the rollers 106 and 108. For example, the belt 102 may be tensioned on and by the rollers 106 and 108, e.g., along the lateral direction L. One of the rollers, e.g., the first roller 106, may be a driven roller. For example, the first roller 106 may be connected to the motor 104 such that the motor 104 is operable to drive, e.g., rotate, the first roller 106. With the belt 102 wound around the rollers 106 and 108, such rotation of the first roller 106 may cause the belt 102 to travel, e.g., rotate, around the air filter 100. Thus, the motor 104 may be operatively connected to the belt 102 through the driven roller, e.g., first roller 106.

Figure 3:
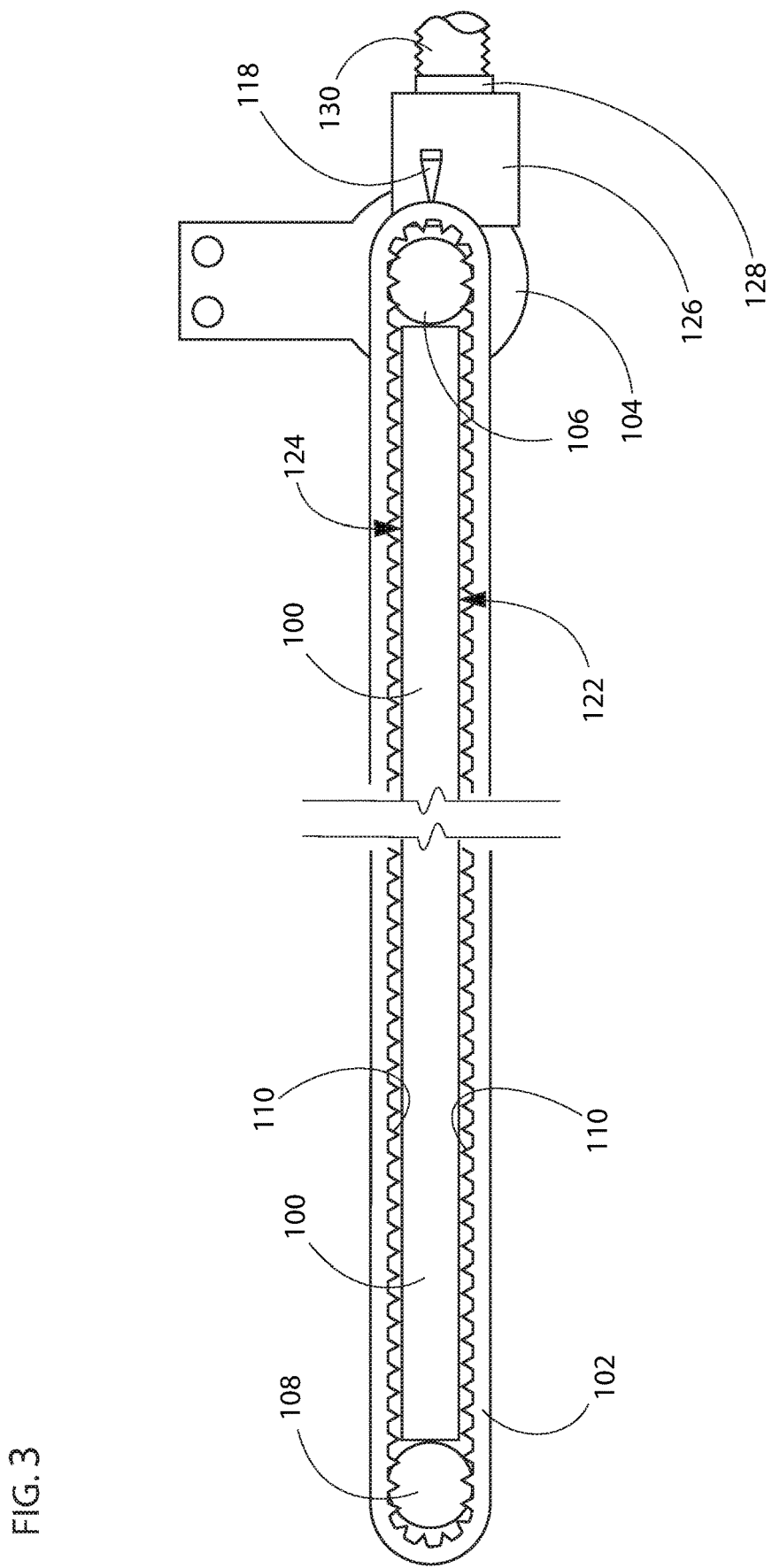
FIG. 3 is an overhead view of portions of an automatic air filter cleaning assembly for an air conditioner unit in accordance with one or more embodiments of the present disclosure.
Figure 4:
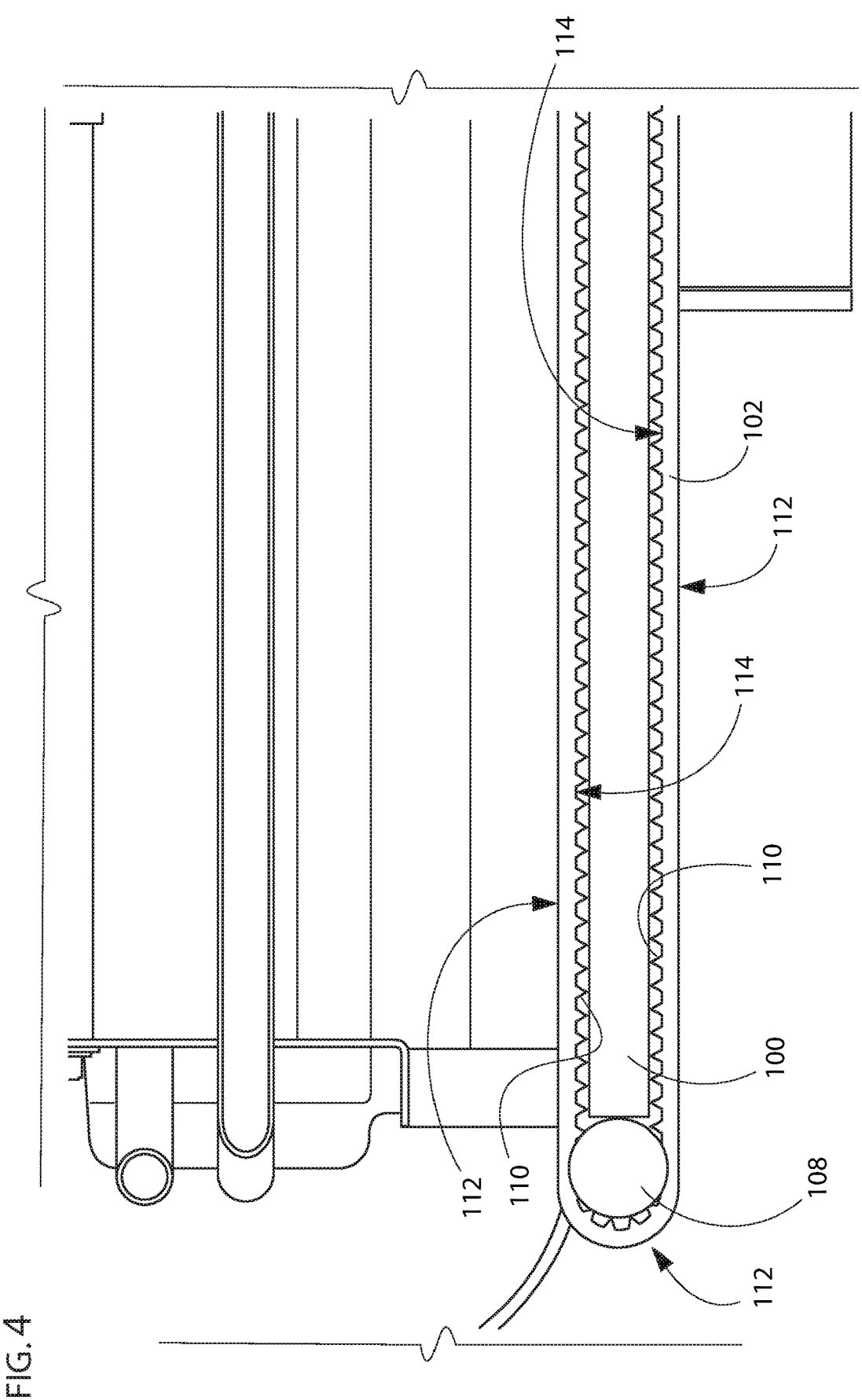
FIG. 4 is an overhead view of a left portion of FIG. 2.
Figure 5:
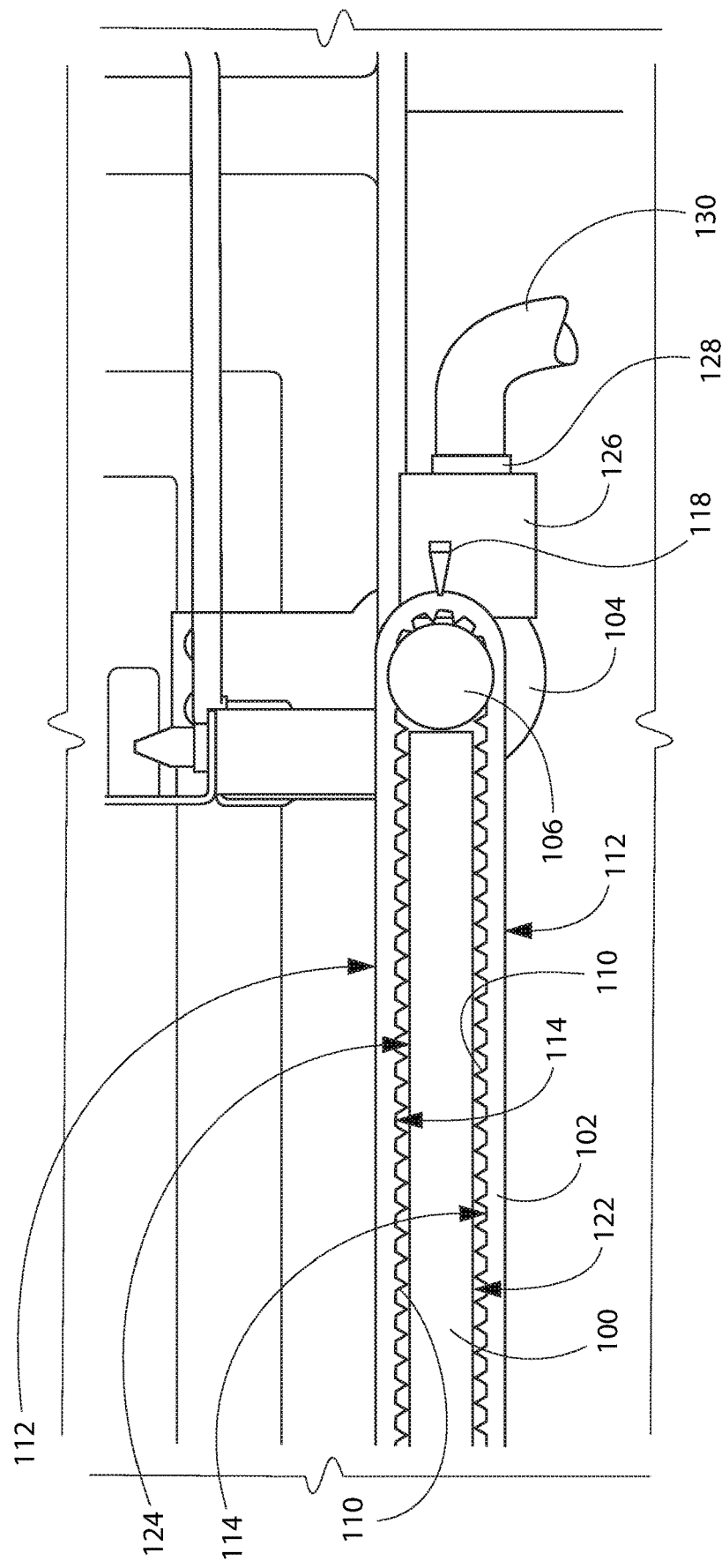
FIG. 5 is an overhead view of a right portion of FIG. 2.

The belt 102 may comprise a woven or mesh material, such as a woven nylon material or other suitable fiber. Accordingly, the belt 102 may be breathable, e.g., the material of the belt 102 may allow air to flow through the belt 102. As illustrated in FIGS. 3-5, the belt 102 may include an outer surface 112 which faces away from the air filter 100 and an inner surface 114 which is opposite the outer surface 112 and faces towards the air filter 100. In particular, the inner surface 114 of the belt 102 may face outer surfaces 122 and 124 of the air filter 100. The outer surfaces 122 and 124 of the air filter 100 may include an upstream surface 122 and a downstream surface 124, e.g., with respect to the flow of air urged by the blower fan 72 through the air filter 100.

The belt 102 may include a plurality of internal bristles 110, e.g., extending from the inner surface 114 of the belt 102 to the outer surfaces 122 and 124 of the air filter 100. The internal bristles 110 may contact the outer surfaces 122 and 124 of the air filter, such as at least the upstream surface 122, such that the internal bristles 110 engage the outer surfaces 122 and 124 of the air filter 100 when the belt 102 rotates around the air filter. As a result of such contact/ engagement, the internal bristles 110 of the belt 102 remove particles from the outer surfaces 122 and 124 of the air filter 100 when the belt 102 rotates around the air filter 100.

As best seen in FIG. 5, the air conditioner unit 10 may also include a stationary brush 118, e.g., the stationary brush 118 may be positioned proximate to one of the first roller 106 and the second roller 108. The stationary brush 118 may be in contact with the outer surface 112 of the belt 102, such that the stationary brush 118 removes the particles from the belt 102 as the belt 102 passes the stationary brush 118 while the belt 102 is rotated around the air filter 100 by the motor 104. For example, the belt 102 may remove particles from outer surfaces 122 and 124 of the air filter 100 and entrap the particles within the belt 102, such as between the internal bristles 110 and/or in the weave or mesh of the belt 102 material, when the belt 102 rotates about the air filter 100. In such embodiments, the particles may be extracted from the belt 102 when the belt 102 passes over at least one of the first roller 106 and the second roller 108. For example, as may be seen in FIGS. 3 through 5, the belt 102, and in particular the internal bristles 110 thereof, may be compressed by the rollers 106 and 108 as the belt 102 passes around the rollers 106 and 108, such that the particles entrapped in the belt 102 are extracted from or wrung out of the belt 102. For example, the belt 102 may be radially compressed by the rollers 106 and 108, e.g., along a radial direction defined by each roller 106 or 108 as the belt 102 passes around the respective roller 106 or 108. The particles entrapped in the belt 102 may be pushed or urged to or towards the outer surface 112 of the belt 102 as the belt 102 passes around each roller 106 and 108. Thus, the stationary brush 118 may remove the particles from the belt 102 as the belt 102 passes the stationary brush 118. For example, after the particles have been extracted from the belt 102 by the roller 106 or 108, the stationary brush 118 may then remove such particles from the outer surface 112 of the belt 102.

The air conditioner unit 10 may also include a dust box 126. In such embodiments, the stationary brush 118 may be positioned proximate the dust box 126 and above the dust box 126 along the vertical direction V, such that the particles removed from the belt 102 by the stationary brush 118 are directed to the dust box 126 by gravity.

As may be seen, e.g., in FIG. 5, the dust box 126 may include a vacuum port 128. The vacuum port 128 may be connected to an external surface of the air conditioner unit 10, e.g., at or proximate to the room front 24 of the air conditioner unit 10, to provide fluid communication from the dust box 126 to the external surface of the air conditioner unit 10. For example, the vacuum port 128 may be connected to a conduit 130 which extends from the dust box 126 at the vacuum port 128 to the external surface of the air conditioner unit 10. Thus, a user may be able to clean or empty the dust box 126, e.g., without having to open or partially disassemble the air conditioner unit 10, such as without having to remove the room front 24 in order to access the air filter 100 or the dust box 126, by attaching a vacuum cleaner to the conduit 130 at the external surface of the air conditioner unit 10 and vacuuming out the dust box 126 through the conduit 130 and the vacuum port 128.

In some embodiments, the dust box 126 may be connected to a weight sensor. The weight sensor may be operable to or configured to detect a weight of the dust box 126, such as to distinguish a full weight of the dust box 126 from an empty weight of the dust box 126. The weight sensor may be in operative communication with the controller 85 of the air conditioner unit 10, whereby the weight sensor may transmit and receive signals to and from the controller 85. For example, the controller 85 may receive a signal from the weight sensor which indicates that a weight of the dust box 126 is greater than or equal to a predetermined weight threshold. The controller 85 may then provide a notification, such as an audible or visible alert, to a user to inform the user that the dust box 126 may be emptied, such as via the vacuum port 128 as described.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An air conditioner unit defining a vertical direction, a lateral direction, and a transverse direction, the vertical direction, the lateral direction, and the transverse direction being mutually perpendicular, the air conditioner unit comprising:
   an inlet grille and an outlet grille providing fluid communication between an indoor portion of the air conditioner and an ambient environment;
   a blower fan positioned in the indoor portion of the air conditioner unit, the blower fan operable to urge air into the indoor portion of the air conditioner unit through the inlet grille and to urge air out of the indoor portion of the air conditioner unit through the outlet grille;
   an air filter positioned between the inlet grille and the outlet grille, whereby air urged by the blower fan passes through and is filtered by the air filter before the air is urged out of the indoor portion of the air conditioner unit through the outlet grille;
   a belt encircling and enclosing the air filter on four sides, the belt comprising internal bristles; and
   a motor operatively connected to the belt, the motor configured to rotate the belt around the air filter, whereby the internal bristles of the belt engage outer surfaces of the air filter and remove particles from the outer surfaces of the air filter, whereby the air filter is cleaned as the motor rotates the belt around the air filter.

2. The air conditioner unit of claim 1, wherein the belt comprises a woven material.

3. The air conditioner unit of claim 1, further comprising a stationary brush in contact with an outer surface of the belt, whereby the stationary brush removes the particles from the belt as the belt passes the stationary brush.

4. The air conditioner unit of claim 3, further comprising a dust box, wherein the stationary brush is positioned proximate the dust box and above the dust box along the vertical direction, whereby the particles removed from the belt by the stationary brush are directed to the dust box by gravity.

5. The air conditioner unit of claim 4, wherein the dust box comprises a vacuum port, the vacuum port connected to an external surface of the air conditioner unit to provide fluid communication from the dust box to the external surface of the air conditioner unit.

6. The air conditioner unit of claim 1, further comprising a first roller and a second roller positioned opposite the first roller along the lateral direction, wherein the belt is wound around the rollers, wherein the belt entraps the particles within the belt when the belt rotates around the air filter, and wherein the particles are extracted from the belt when the belt passes over at least one of the first roller and the second roller.

7. The air conditioner unit of claim 6, further comprising a stationary brush positioned proximate to one of the first roller and the second roller and in contact with an outer surface of the belt, whereby the stationary brush removes the particles from the belt after the particles have been extracted from the belt as the belt passes the stationary brush.

8. The air conditioner unit of claim 1, wherein the motor is a stepper motor.

9. An air conditioner unit comprising:
   a blower fan;
   an inlet grille upstream of the blower fan;
   an outlet grille downstream of the blower fan;
   an air filter positioned between the inlet grille and the outlet grille;
   a belt encircling and enclosing the air filter on four sides, the belt comprising internal bristles; and
   a motor operatively connected to the belt, the motor configured to rotate the belt around the air filter, whereby the internal bristles of the belt engage outer surfaces of the air filter and remove particles from the outer surfaces of the air filter, whereby the air filter is cleaned as the motor rotates the belt around the air filter.

10. The air conditioner unit of claim 9, wherein the belt comprises a woven mesh material.

11. The air conditioner unit of claim 9, further comprising a stationary brush in contact with an outer surface of the belt, whereby the stationary brush removes the particles from the belt as the belt passes the stationary brush.

12. The air conditioner unit of claim 11, further comprising a dust box, wherein the stationary brush is positioned proximate the dust box and above the dust box whereby the particles removed from the belt by the stationary brush are directed to the dust box by gravity.

13. The air conditioner unit of claim 12, wherein the dust box comprises a vacuum port, the vacuum port connected to an external surface of the air conditioner unit to provide fluid communication from the dust box to the external surface of the air conditioner unit.

14. The air conditioner unit of claim 9, further comprising a first roller and a second roller positioned opposite the first roller, wherein the belt is wound around the rollers, wherein the belt entraps the particles within the belt when the belt rotates around the air filter, and wherein the particles are extracted from the belt when the belt passes over at least one of the first roller and the second roller.

15. The air conditioner unit of claim 14, further comprising a stationary brush positioned proximate to one of the first roller and the second roller and in contact with an outer surface of the belt, whereby the stationary brush removes the particles from the belt after the particles have been extracted from the belt as the belt passes the stationary brush.

16. The air conditioner unit of claim 9, wherein the motor is a stepper motor.

\* \* \* \* \*